(12) United States Patent
Brada

(10) Patent No.: US 12,471,689 B2
(45) Date of Patent: Nov. 18, 2025

(54) SKIN TREATMENT SYSTEM

(71) Applicant: KONINKLIJKE PHILIPS N.V., Eindhoven (NL)

(72) Inventor: Ype Bernardus Brada, Leeuwarden (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 148 days.

(21) Appl. No.: 17/917,054

(22) PCT Filed: Apr. 1, 2021

(86) PCT No.: PCT/EP2021/058561
§ 371 (c)(1),
(2) Date: Oct. 5, 2022

(87) PCT Pub. No.: WO2021/209266
PCT Pub. Date: Oct. 21, 2021

(65) Prior Publication Data
US 2023/0157432 A1    May 25, 2023

(30) Foreign Application Priority Data
Apr. 14, 2020  (EP) .................................... 20169291

(51) Int. Cl.
*A45D 26/00*        (2006.01)
*G01N 19/02*        (2006.01)

(52) U.S. Cl.
CPC ......... *A45D 26/0033* (2013.01); *G01N 19/02* (2013.01)

(58) Field of Classification Search
CPC ...................................................... G01N 19/02
See application file for complete search history.

(56) References Cited

U.S. PATENT DOCUMENTS

2008/0168657 A1  7/2008  Cloke
2011/0130770 A1  6/2011  Kraus
(Continued)

FOREIGN PATENT DOCUMENTS

EP    3262971 A1    1/2018
EP    3272247 A1    1/2018
(Continued)

OTHER PUBLICATIONS

International Search Report and Written Opinion Dated May 12, 2021 For International Application No. PCT/EP2021/058561 Filed Apr. 1, 2021.

*Primary Examiner* — Todd J Scherbel

(57) ABSTRACT

A skin treatment system (1) such as a depilating system comprises a functional member (20) that is configured to perform a treatment action on skin (2) and to be moved over the skin (2) during operation of the system (1), and a measurement unit (40) including a measurement member (41) that is configured to also be moved over the skin (2) during operation of the functional member (20) and to contact the skin (2) in the process. The measurement unit (40) is configured to measure at least a force value in an advancing direction in which the measurement member (41) is moved over the skin (2) during operation of the functional member (20). The measured force value in the advancing direction is used for the purpose of determining a friction coefficient value representative of the friction coefficient of the skin (2), which allows for assessing skin condition.

5 Claims, 2 Drawing Sheets

(56) References Cited

U.S. PATENT DOCUMENTS

| | | |
|---|---|---|
| 2011/0197726 A1 | 8/2011 | Kraus |
| 2013/0067986 A1* | 3/2013 | Girdler ................. G01N 19/02 73/9 |
| 2017/0172277 A1 | 6/2017 | Mehaddene |
| 2018/0000219 A1 | 1/2018 | Roenneberg |
| 2019/0306259 A1 | 10/2019 | Burghardt et al. |
| 2020/0217779 A1 | 7/2020 | Brada |

FOREIGN PATENT DOCUMENTS

| | | |
|---|---|---|
| FR | 2749793 A1 | 12/1997 |
| KR | 20100058033 A | 6/2010 |
| WO | 2013093772 A1 | 6/2013 |
| WO | 2015/145466 A2 | 10/2015 |
| WO | 2019/011523 A1 | 1/2019 |

* cited by examiner

SKIN TREATMENT SYSTEM

CROSS REFERENCE TO RELATED APPLICATIONS

This application is the U.S. National Phase application under 35 U.S.C. § 371 of International Application No. PCT/EP2021/058561 filed Apr. 1, 2021, which claims the benefit of European Patent Application Number 20169291.0 filed Apr. 14, 2020. These applications are hereby incorporated by reference herein.

FIELD OF THE INVENTION

The invention relates to a skin treatment system comprising a functional member configured to perform a treatment action on skin and to be moved over the skin during operation of the system.

BACKGROUND OF THE INVENTION

An example of a skin treatment system as mentioned in the opening paragraph is a depilating system that is configured to perform skin treatment in the form of hair removal from skin and that comprises a depilating body as the functional member. In a conventional design, the depilating body is generally shaped like a cylinder having a circular periphery, wherein the depilating body is rotatable about a rotation axis extending in a longitudinal direction of the depilating body. It is possible for the functional member to be held in a bent configuration. Further, the depilating body is provided with at least one hair-catching space, wherein the size of the at least one hair-catching space in the longitudinal direction is variable along a periphery of the depilating body or through compression and extension of the depilating body in the longitudinal direction during rotation of the depilating body. Operation of the depilating system for the purpose of removing hair from skin involves driving the depilating body so as to rotate, placing the depilating body on the skin, and letting the depilating body rotate over the skin, so that hair is caught in the at least one hair-catching space as the size of the at least one hair-catching space decreases and is pulled from the skin as the depilating body advances.

In the context of a skin treatment system such as a depilating system, it may happen that a process of performing a skin treatment action involves skin irritation as a disadvantageous side effect. In the example of the depilating system, skin irritation may result from continuous friction from the depilating body rotating over the skin during operation of the depilating system. Further, in view of the fact that hair protruding from the skin is pulled, it may happen bumps and irritated spots occur, which causes a change of characteristics of the skin surface.

In view of the foregoing, it is desirable to provide a reliable way of determining skin properties during a skin treatment action that is performed by means of a skin treatment system, so that at least one of a possibility of providing a user of the skin treatment system with relevant information about the condition of the skin and a possibility of automatically adjusting the way in which one or more components of the skin treatment system are operated is obtained. Providing a user with information may be done during a skin treatment action and/or after a skin treatment action. Providing the user with information during a skin treatment action enables the user to decide about adjusting a way of using the skin treatment system, whereas providing the user with information after a skin treatment makes the user aware of her/his skin condition in the first place and enables the user to decide about possible further skin treatment actions such as applying a soothing cream to the skin, for example. In respect of the possibility of automatically adjusting the way in which one or more components of the skin treatment system are operated, it is noted that this may specifically be aimed at avoiding a further increase of skin irritation when a level of skin irritation is found to be above an acceptable reference level, for example.

SUMMARY OF THE INVENTION

In view of the foregoing, the invention provides a skin treatment system comprising a functional member configured to perform a treatment action on skin and to be moved over the skin during operation of the system, a measurement unit including a measurement member configured to also be moved over the skin during operation of the functional member and to contact the skin in the process, wherein the measurement unit is configured to obtain at least one measured force value by measuring at least one force value related to interaction of the measurement member with the skin, including a force value in an advancing direction in which the measurement member is moved over the skin during operation of the functional member, and a processor unit configured to receive the at least one measured force value from the measurement unit, and to determine a friction coefficient value representative of the friction coefficient of the skin on the basis of at least a measured force value in the advancing direction.

It follows from the foregoing definition that the skin treatment system according to the invention comprises a measurement unit and a processor unit besides the functional member. During operation of the skin treatment system, the measurement unit measures a force value in an advancing direction, i.e. the direction of movement of the measurement member over the skin, and probably one or more other force values related to interaction of the measurement member with the skin. Input obtained from the measurement unit is used by the processor unit in a process of determining a friction coefficient value representative of the friction coefficient of the skin. The functional unit and the measurement unit may be integrated in a hand-held appliance, in which case the processor unit may be a remote unit located outside of the hand-held appliance, which does not alter the fact that other options are covered by the invention as well. The treatment action on the skin may be one of skin brushing and a hair removal through depilation, for example, wherein it is to be noted that the invention is not restricted to a particular type of skin treatment in any way.

According to an insight underlying the invention, the friction coefficient of the skin is related to aspects of the condition of the skin such as wetness, elasticity and roughness, i.e. to skin-related features. It is found that determining a friction coefficient value representative of the friction coefficient of the skin is useful in assessing the condition of the skin. When the invention is put to practice, it is achieved that objective indications about the condition of the skin are obtained, wherein there is no need for performing separate measurement actions because measurement results are obtained during a skin treatment action.

In the framework of the invention, various options are applicable when it comes to the way in which determining the friction coefficient value takes place. According to a first option, the processor unit is configured to determine the friction coefficient value by dividing the measured force value in the advancing direction by a reference force value.

For example, the reference force value may be a value representative of an average force involved in a user pressing the functional unit against the skin. According to a second option, the measurement unit is configured to also measure a value of a normal force of contact of the measurement member to the skin, and the processor unit is configured to determine the friction coefficient value by dividing the measured force value in the advancing direction by a measured value of the normal force. According to a third option, the skin treatment system further comprises an arrangement configured to enable adjustment of a normal force of contact of the measurement member to the skin, and the processor unit is configured to receive a value of the normal force set by means of the arrangement from the arrangement, and to determine the friction coefficient value by dividing the measured force value in the advancing direction by the set value of the normal force.

In an advantageous embodiment of the skin treatment system according to the invention, the processor unit is further configured to determine whether or not the friction coefficient value is in a reference range of friction coefficient values. For example, the reference range of friction coefficient values is one of i) a range between a minimum friction coefficient value and a maximum friction coefficient value and ii) a range above or below a single discriminatory friction coefficient value. It is practical if the reference range of friction coefficient values is a range of friction coefficient values associated with a skin-related feature, wherein it is noted that the skin-related feature may be one of a group of features including wetness, elasticity and roughness.

By having a functionality in the skin treatment system of determining whether or not the friction coefficient value is in a reference range of friction coefficient values, it is possible to use the skin treatment system to provide skin condition information to a user, wherein it may further be possible to provide appropriate suggestions about how to further treat the skin to the user as well. In this respect, it is practical if the skin treatment system further comprises a display device, and if the processor unit is further configured to provide output in respect of the skin-related feature to the display device.

As mentioned in the foregoing, it is desirable to have a possibility of automatically adjusting the way in which one or more components of the skin treatment system are operated. In view thereof, it is practical if the skin treatment system according to the invention further comprises a control unit configured to control operation of the functional member, and if the processor unit is further configured to determine at least one parameter of operation of the functional member on the basis of the friction coefficient value and to provide output in respect of the least one parameter of operation of the functional member to the control unit. For example, in the case of the skin treatment system being a depilating system, the at least one parameter of operation of the functional member may involve a rotation speed of the depilating body. Generally speaking, in such a case, a method of control of operation of the depilating system may be realized according to which the rotation speed of the depilating body is reduced when the friction coefficient value indicates a high level of skin irritation. According to another feasible option, the at least one parameter of operation of the functional member may involve an extent to which the depilating body is extended relative to a housing portion or the like supporting the depilating body. Generally speaking, in such a case, a method of control of operation of the depilating system may be realized according to which the depilating body is further retracted relative to the housing portion when the friction coefficient value indicates a high level of skin irritation.

The invention covers any suitable embodiment of the measurement unit. For example, it may be practical if the measurement unit includes a resilient member acting on the measurement member. An example of the resilient member as mentioned is a coil spring. Also, it may be practical if the skin treatment system is configured to obtain more measurement values than at least one force value related to interaction of the measurement member with the skin. For example, the skin treatment system may further comprise at least one of a position sensor, a speed sensor and an acceleration sensor associated with the measurement member.

According to an advantageous option existing in the framework of the invention, the measurement member may comprise two areas positioned at opposite sides of the measurement member and having differently shaped outlines. In this way, it is possible to realize different interactions of the measurement member with the skin, depending on a direction of movement of the measurement member over the skin, on the basis of which reliable measurement results in respect of various skin-related features may be obtained.

An embodiment of the skin treatment system according to the invention is feasible in which the measurement unit further includes at least one additional measurement member configured to also be moved over the skin during operation of the functional member and to contact the skin in the process, wherein the measurement unit is configured to obtain at least one additional measured force value by measuring at least one force value related to interaction of the at least one additional measurement member with the skin. In this way, it is possible to achieve enhanced accuracy of the process of determining the friction coefficient value representative of the friction coefficient of the skin, because the influence of factors such as orientation of the measurement member is decreased.

The above-described and other aspects of the invention will be apparent from and elucidated with reference to the following detailed description of a depilating system comprising a measurement unit, wherein various possibilities in respect of the configuration of the measurement unit and components thereof are addressed.

BRIEF DESCRIPTION OF THE DRAWINGS

The invention will now be explained in greater detail with reference to the figures, in which equal or similar parts are indicated by the same reference signs, and in which.

DETAILED DESCRIPTION OF THE EMBODIMENTS

Figure 1:
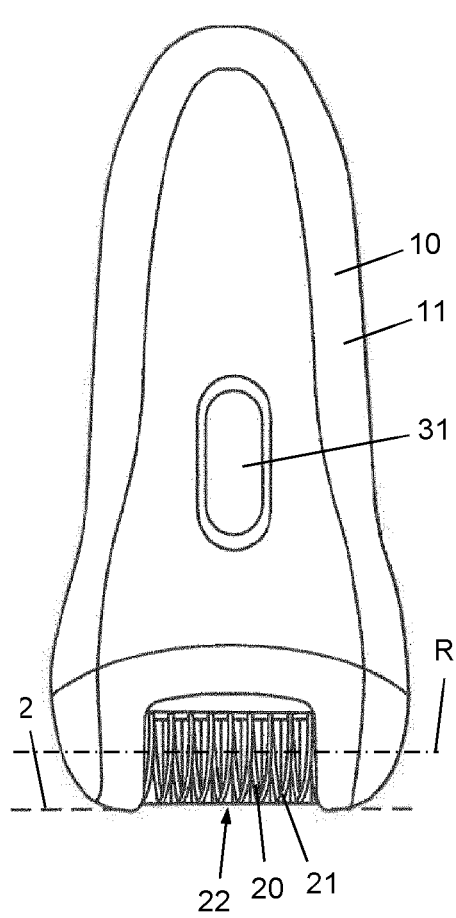
FIG. 1 diagrammatically shows a front view of a handheld depilating device that is part of a depilating system according to an embodiment of the invention, FIG. 2 diagrammatically shows a depilating body, a housing portion supporting the depilating body, a measurement unit, a processor unit, control unit and a display device of the depilating system.

In the following, various features of a depilating system 1 according to an embodiment of the invention will be described, wherein it is noted that the depilating system 1 is just one example of many types of skin treatment systems which are feasible in the framework of the invention. With reference to FIG. 1, it is further noted that it is practical if the depilating system 1 comprises a hand-held appliance 10 including a housing 11 for accommodating a number of components of the depilating system 1. By having the hand-held appliance 10, convenient use of the depilating system 1 on various body portions including face, armpits and legs is enabled.

The depilating system 1 is configured to be used for the purpose of performing a hair removing operation on skin. In view thereof, the depilating system 1 comprises a depilating body 20 which is intended to actually interact with hair to be plucked from the skin. For the purpose of catching and clamping the hair, the depilating body 20 has hair-clamping members 21 with hair-catching spaces 22 between them. In the shown example, the depilating body 20 is generally shaped like a cylinder having a circular periphery, wherein the depilating body 20 is rotatable about a rotation axis R extending in a longitudinal direction of the depilating body 20. The size of the hair-catching spaces 22 in the longitudinal direction is variable along a periphery of the depilating body 20. It will be understood that the depilating system 1 comprises components such as a driving mechanism (not shown) for driving the depilating body 20 so as to actually perform a rotational movement about the rotation axis R during operation of the depilating system 1 and an electric supply arrangement (not shown) such as a (rechargeable) battery in case the hand-held appliance 10 is cordless.

Figure 2:
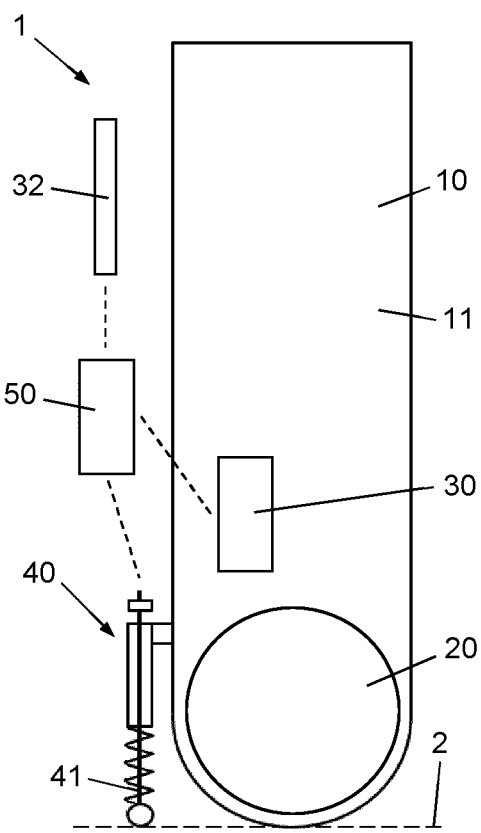

As can be seen in FIG. 2, it is practical if the depilating system 1 further comprises a control unit 30 configured to control operation of the depilating body 20. For the purpose of allowing a user to activate and deactivate the depilating system 1, a suitable user interface 31 such as a button may be provided on the housing 11 of the hand-held appliance 10. When the depilating system 1 is activated, the depilating body 20 is driven so as to rotate. Skin 2 to be subjected to a depilating action by means of the depilating system 1 is diagrammatically indicated in FIGS. 1 and 2 by means of a dashed line. Proper use of the depilating system 1 involves having the depilating system 1 in the activated state and handling the hand-held appliance 10 in such a way that the depilating body 20 rotates over the skin 2. In the process, hair is caught in the hair-catching spaces 22 of the depilating body 20 and is pulled from the skin 2 as the depilating body 20 advances.

FIG. 2 also illustrates that the depilating system 1 further comprises a measurement unit 40 and a processor unit 50. The measurement unit 40 includes a probe-like measurement member 41 configured to be moved over the skin 2 along with the depilating body 20 during operation thereof and to contact the skin 2 in the process, and serves for measuring a force value in an advancing direction in which the measurement member 41 is moved over the skin 2 during operation of the depilating body 20 and possibly at least one other force value related to interaction of the measurement member 41 with the skin 2. For the sake of completeness, it is noted that the force in the advancing direction is a friction-related force and has a sign that is opposite to the advancing direction. During operation of the depilating system 1, the measurement unit 40 outputs a measured force value in the advancing direction and possibly at least one other measured force value to the processor unit 50, and the processor unit 50 functions to determine a friction coefficient value representative of the friction coefficient of the skin 2 on the basis of at least the measured force value in the advancing direction.

The processor unit 50 may be configured in any suitable way for determining the friction coefficient value. For example, it is possible to determine the friction coefficient value by dividing the measured force value in the advancing direction by a reference force value. It is also possible to additionally measure a value of a normal force of contact of the measurement member 41 to the skin 2, or to set a value of the normal force, and to determine the friction coefficient value by dividing the measured force value in the advancing direction by a measured or set value of the normal force. In any case, an important advantage of the invention resides in the fact that the skin friction measurement can be performed during a depilating action so that it is not necessary to perform a separate measurement.

Information relating to the friction coefficient of the skin 2 is suitable to be used in a process of assessing one or more skin-related features constituting aspects of the condition of the skin 2. For example, an indication of wetness, elasticity and/or roughness of the skin 2 may be derived from the friction coefficient value. In order to be able to perform at least a step in a skin condition assessment process as mentioned, the processor unit 50 may further be configured to determine whether or not the friction coefficient value is in a reference range of friction coefficient values. Assuming that the reference range of friction coefficient values is a range of friction coefficient values associated with a skin-related feature, it may be advantageous if the epilating system 1 further comprises a display device 32, and if the processor unit 50 is further configured to provide output in respect of the skin-related feature to the display device 32 so that a user may be informed through the display device 32. Also, it may be advantageous if the processor unit 50 is further configured to determine at least one parameter of operation of the depilating body 20 on the basis of the friction coefficient value and to provide output in respect of the least one parameter as mentioned to the control unit 30, as in such a case, a self-adjusting functionality of the depilating system 1 is realized. For example, if the friction coefficient value is indicative of a high level of skin irritation, the processor unit 50 may provide output about a rotation speed of the depilating body 20 to the control unit 30, particularly output aimed at decreasing the rotation speed.

Exchange of signals between the processor unit 50 and the control unit 30, the display device 32, and the measurement unit 40, respectively, is indicated by means of dashed lines in FIG. 2. The processor unit 50 and the display device 32 may be accommodated in the hand-held appliance 10, but it may also be practical if at least one of the processor unit 50 and the display device 32 is arranged outside of the hand-held appliance 10.

Figure 3:
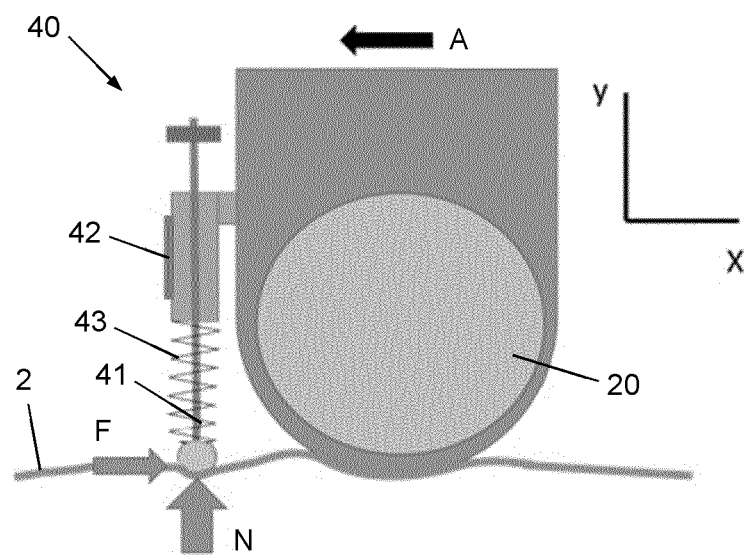
FIG. 3 illustrates a first possible configuration of the measurement unit.

With reference to FIG. 3, details of a first option in respect of the configuration of the measurement unit 40 will now be elucidated. The advancing direction in which the measurement member 41 is moved over the skin 2 during operation of the depilating body 20 is indicated by means of an arrow A at the top of FIG. 3. Further, a direction along the skin 2 is denoted as x direction, and the skin's normal direction is denoted as y direction in FIG. 3. Besides the measurement member 41, the measurement unit 40 comprises a load cell 42 for measuring a force value in the advancing direction A, and a spring 43 creating a spring force on the measurement member 41. The load cell 42 is particularly arranged and configured to deform under the influence of a force acting in the advancing direction A. As is known from the field of load cells, it is practical to use amplification hardware for converting a change of electrical resistance of the load cell 42 caused by deformation of the load cell 42 into an electrical signal, which electrical signal is therefore directly related to the value of the force acting in the advancing direction A.

The way in which the measurement unit 40 that is configured according to the first option described in the foregoing functions is as follows. The measurement unit 40 is capable of performing a measurement of the force value in the advancing direction A as the depilating body 20 is advanced over the skin 2 in the advancing direction A and the measurement member 41 automatically makes the same movement. At the position where the measurement member 41 contacts the skin 2, forces are prevailing in both the x direction and the y direction, namely a drag force F in the x direction and a normal force N in the y direction, the drag force F being related to friction between the measurement member 41 and the skin 2, and the normal force N being determined by the spring 43. The drag force F is influenced by properties of the measurement member 41 at the position of contact to the skin 2, such as shape, material and surface characteristics. Hence, such properties may be chosen so as to optimize the measurement process in any way as desired. By applying a relatively high pretension in the spring 43, combined with a relatively low spring constant, it can be achieved that the contribution of a variation of indentation of the measurement member 41 has only small impact on the spring force so that a quasi-constant value of the normal force N is realized.

All in all, when the depilating system 1 is equipped with a measurement unit 40 that is configured according to the first option described in the foregoing, the friction coefficient value can be determined by the processor unit 50 by dividing a measured value of the drag force F by the value of the spring force.

Figure 4:
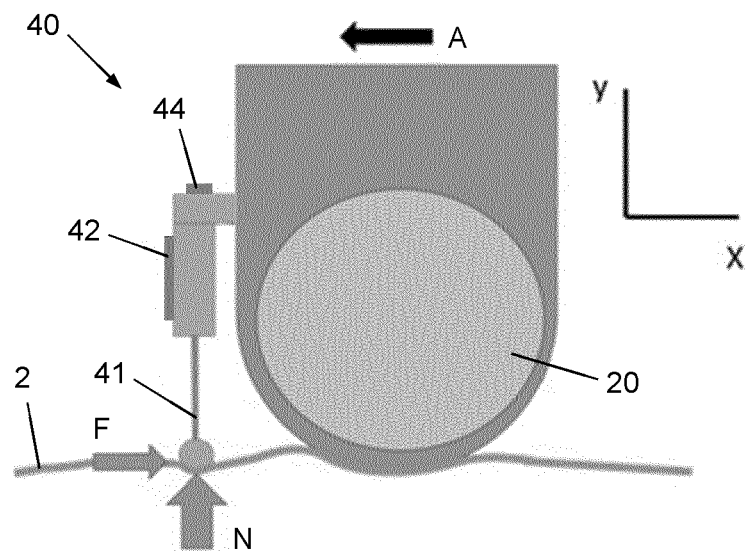
FIG. 4 illustrates a second possible configuration of the measurement unit.

The spring 43 can be omitted from the measurement unit 40 when the measurement unit 40 is equipped with an another load cell 44, for example, as illustrated in FIG. 4 which relates to second option in respect of the configuration of the measurement unit 40, particularly a load cell 44 that is arranged and configured to deform under the influence of a normal force N. In such a case, the friction coefficient value can be determined by the processor unit 50 by dividing a measured value of the drag force F by a measured value of the normal force N. Yet another option which allows for omitting the spring 43 is an option involving an opportunity for the user to set the value of the force that is applied to the measurement member 41 in the y direction. On the other hand, combined use of a spring 43 and a normal force load cell 44 is feasible. Especially when the spring constant is known, an indication of an angle of the hand-held appliance 10 on the skin 2 can be obtained from output provided by the normal force load cell 44 in such a case. In the context of a depilating system 1, this may particularly be advantageous because effectiveness of use of the system 1 is related to the angle as mentioned.

Figure 5:
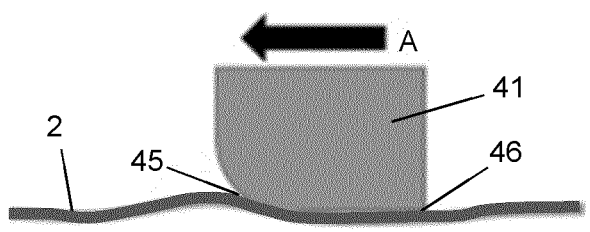
FIGS. 5 and 6 illustrate interaction between skin and a measurement member of the measurement unit which comprises two areas positioned at opposite sides of the measurement member and having differently shaped outlines, for two opposite directions of movement of the depilating body along the skin.
Figure 6:
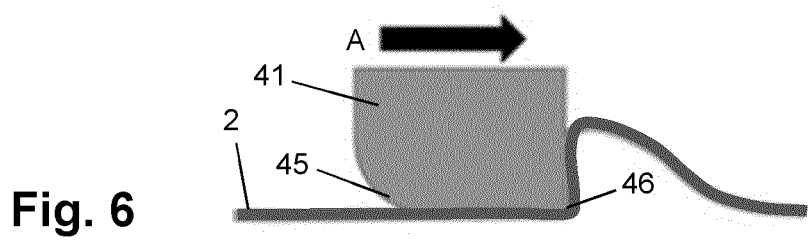

An option of the designing the measurement member 41 so as to comprise two areas 45, 46 positioned at opposite sides of the measurement member 41 and having differently shaped outlines will now be explained with reference to FIGS. 5 and 6 in which skin 2 and a portion of the measurement member 41 including the areas 45, 46 are shown. For illustration purposes, the areas 45, 46 are shown to be different to an extreme extent, wherein the one area 45 includes a curved edge zone and the other area 46 includes a sharp edge zone in which two straight zones connect to each other at an angle of 90°. When the measurement member 41 is moved in the advancing direction A with the area 45 including the curved edge zone at the front, there is hardly doming of the skin 2 in front of the measurement member 41, as can be seen in FIG. 5. In this way, measurement of force values related to surface characteristics of the skin 2 can take place, wherein it is noted that roughness of the skin 2, presence of sebum on the skin 2 and use of personal care products on the skin 2 are examples of such surface characteristics. When the measurement member 41 is moved in the advancing direction A with the area 46 including the sharp edge zone at the front, a so-called ploughing effect is obtained, as a result of which the skin 2 is stowed against the measurement member 41, as can be seen in FIG. 6. In this way, measurement of force values related to elasticity of the skin 2 and deeper skin tissue characteristics can take place.

According to an additional or another option, the epilating system 1 can be provided with a set of at least two interchangeable measurement members 41 of different design, so that a user can choose the measurement member 41 that matches best in view of one or more relevant types of skin-related feature.

Further information about the use of the depilating system 1 can be obtained when the depilating system 1 is equipped with one or more sensors such as an accelerometer. A combination of the components used in skin friction measurement and an accelerometer may improve accuracy of the skin friction measurement. In the first place, an accelerometer can be used to assess whether the measurement member 41 is placed correctly on the skin 2. If this appears not to be the case, feedback can be provided to the user so that she/he may act to correct the positioning of the measurement member 41. In the second place, it is a known fact that friction has a static and a dynamic aspect, so that skin surface friction is dependent on movement. An accelerometer can be used to detect movement and to determine movement speed. In the third place, an accelerometer or another type of positioning sensing device may be used to assess on which body portion the measurement member 41 is used. It may be relevant to obtain such information as skin surface friction is known to be different for different body portions, and the measured force value in the advancing direction A can be corrected in an appropriate manner if the actual body portion is known.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms "comprise" and "include" as used in this text will be understood by a person skilled in the art as covering the term "consist of". Hence, the term "comprise" or "include" may in respect of an embodiment mean "consist of", but may in another embodiment mean "contain/have/be equipped with at least the defined species and optionally one or more other species".

Notable aspects of the invention are summarized as follows. A skin treatment system 1 such as a depilating system comprises a functional member 20 that is configured to perform a treatment action on skin 2 and to be moved over the skin 2 during operation of the system 1, and a measurement unit 40 including a measurement member 41 that is configured to also be moved over the skin 2 during operation of the functional member 20 and to contact the skin 2 in the process. The measurement unit 40 is configured to measure at least a force value in an advancing direction A in which the measurement member 41 is moved over the skin 2 during operation of the functional member 20. The measured force value in the advancing direction A is used for the purpose of determining a friction coefficient value representative of the friction coefficient of the skin 2, which allows for assessing the condition of the skin 2.

The invention claimed is:

1. A skin treatment system, comprising:
   a functional member configured to perform a treatment action on skin and to be moved over the skin during operation of the system,
   a measurement unit including a measurement member configured to also be moved over the skin during operation of the functional member and to contact the skin in the process, wherein the measurement unit is configured to obtain at least one measured force value by measuring at least one force value related to interaction of the measurement member with the skin, including a force value in an advancing direction (A) in which the measurement member is moved over the skin during operation of the functional member, and
   a processor unit configured to receive the at least one measured force value from the measurement unit, and to determine a friction coefficient value representative of the friction coefficient of the skin on the basis of the force value in the advancing direction (A), wherein the processor unit is further configured to determine whether or not the friction coefficient value is in a reference range of friction coefficient values.

2. The skin treatment system according to claim 1, wherein the reference range of friction coefficient values is one of i) a range between a minimum friction coefficient value and a maximum friction coefficient value and ii) a range above or below a single discriminatory friction coefficient value.

3. The skin treatment system according to claim 1, wherein the reference range of friction coefficient values is a range of friction coefficient values associated with a skin-related feature.

4. The skin treatment system according to claim 3, wherein the skin-related feature is one of a group of features including wetness, elasticity and roughness.

5. The skin treatment system according to claim 3, further comprising a display device, wherein the processor unit is further configured to provide output in respect of the skin-related feature to the display device.

* * * * *